United States Patent [19]

Nishida et al.

[11] Patent Number: 4,754,349
[45] Date of Patent: Jun. 28, 1988

[54] VIBRATION ABSORBING SUPPORT ASSEMBLY FOR A DISC MEMORY

[75] Inventors: Hiroshi Nishida, Kanagawa; Masami Suzuki, Odawara; Jun Naruse, Odawara; Tsuyoshi Takahashi, Odawara, all of Japan

[73] Assignee: Hitachi, Ltd., Tokyo, Japan

[21] Appl. No.: 918,374

[22] Filed: Oct. 14, 1986

[30] Foreign Application Priority Data

Oct. 18, 1985 [JP] Japan .................. 60-231139

[51] Int. Cl.$^4$ ............................ G11B 17/00
[52] U.S. Cl. ........................ 360/97; 360/98
[58] Field of Search .................. 360/97–99, 360/133

[56] References Cited

U.S. PATENT DOCUMENTS

| 3,643,242 | 2/1972 | Bryer | 360/98 |
| 3,768,083 | 10/1973 | Pejcha | 360/98 |
| 3,886,595 | 5/1975 | Swain et al. | 360/98 X |
| 4,005,493 | 1/1977 | Morgan | 360/97 X |
| 4,062,049 | 12/1977 | Dirks | 360/78 |

*Primary Examiner*—John H. Wolff
*Attorney, Agent, or Firm*—Fay, Sharpe, Beall, Fagan, Minnich & McKee

[57] ABSTRACT

A disc memory device has a disc memory assembly comprised of a disc, head and a head actuator. The assembly is movably mounted to a base of the disc memory device such that it can move in the same direction as an operative direction of the head actuator, thereby ensuring that vibrations generated in response to acceleration/deceleration of the actuator can be absorbed by the whole of the disc memory assembly.

10 Claims, 1 Drawing Sheet

VIBRATION ABSORBING SUPPORT ASSEMBLY FOR A DISC MEMORY

BACKGROUND OF THE INVENTION

This invention relates to a disc memory device such as a magnetic disc storage.

In a movable head type magnetic disc storage used as a memory device, a magnetic head is positioned at a desired track on the surface of a magnetic disc through servo control. In positioning, as soon as a request for calling a specified piece of information on the magnetic disc surface has been issued, the magnetic head is moved at a high speed radially of the magnetic disc so as to decrease the call time. Accordingly, an actuator of relatively high mechanical output energy is used for moving the magnetic head and for positioning.

Accordingly, when the high output actuator which is fixedly mounted on a base is energized for quick movement of the magnetic head in response to a call instruction, it is affected by abrupt acceleration/deceleration control to undergo a shock, and consequently a carriage carrying the magnetic head and the base are forced to vibrate, followed by occurrence of off tracking (or a tracking error) in the magnetic disc memory device.

With the trend toward increased recording density, the above disadvantage has been more aggravated. A prior art technique for coping with this problem is found in a proposal disclosed in, for example, U.S. Pat. No. 3,643,242 wherein a magnetic circuit block for a voice coil motor serving as an actuator is made in the form of a movable structure which can absorb the above-mentioned shock. Disadvantageously, the movable structure is massive and a device of this proposal becomes large-sized and complicated by incorporating the massive movable structure. In addition, the dust generated from the movable structure can not be shielded sufficiently.

SUMMARY OF THE INVENTION

An object of this invention is to provide a disc memory device which can absorb vibrations generated in response to acceleration/deceleration of an actuator without being affected by the above prior art disadvantages.

To accomplish the above object, according to this invention, the whole of a disc memory assembly incorporating an actuator is made in the form of a movable structure which is movable in the same direction as an operative direction of the actuator, so that vibrations generated upon acceleration/deceleration of the actuator may be absorbed by the whole assembly.

DESCRIPTION OF THE PREFERRED EMBODIMENT

A preferred embodiment of the invention will now be described with reference to the accompanying drawings.

Figure 1:
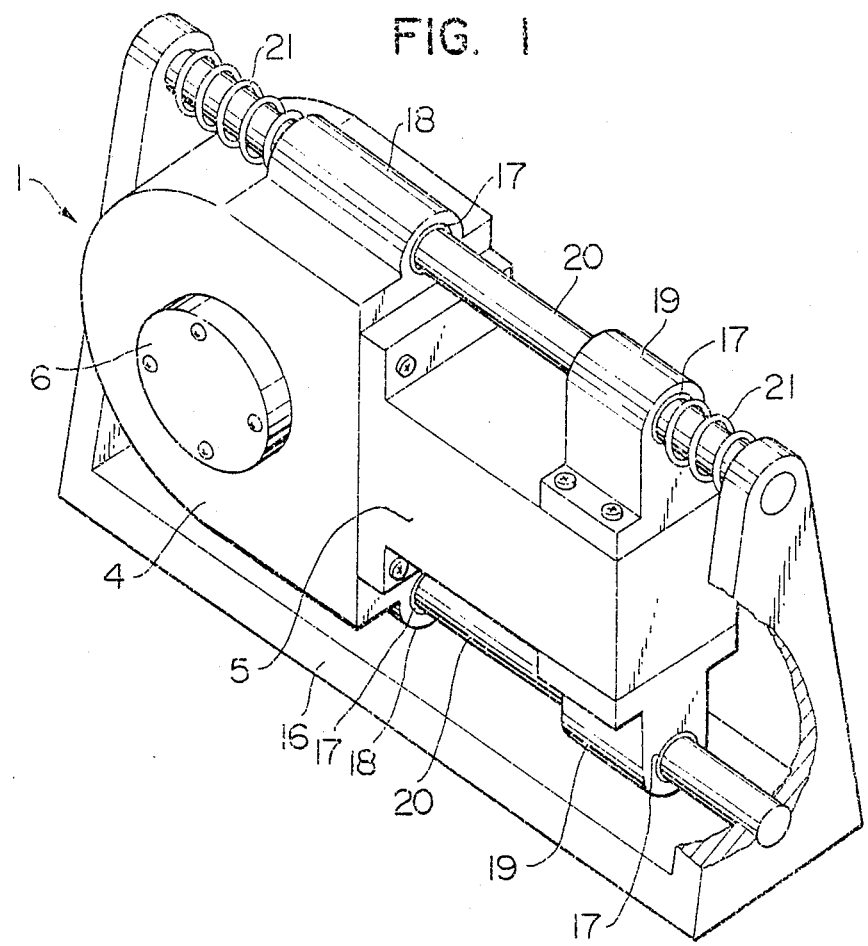
FIG. 1 is a perspective view of an embodiment of a magnetic disc memory device according to the invention.
Figure 2:
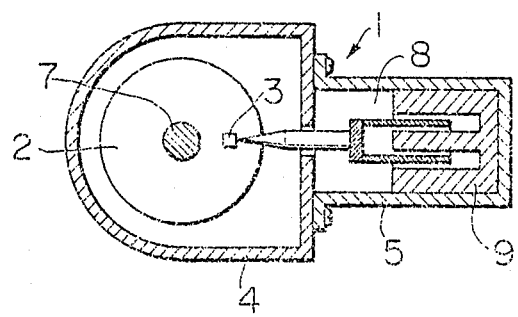
FIG. 2 is a sectional view showing the internal construction of the FIG. 1 device.

Referring to FIGS. 1 and 2, a magnetic disc memory device has a disc memory assembly 1 including a housing 4 in which a magnetic disc 2 recorded with data and a recording/reproducing magnetic head 3 are accomodated, and a linear drive actuator 5 for moving the magnetic head 3. The magnetic disc 2 is fixedly mounted on a spindle 7 rotated by a motor 6. The actuator 5 is a voice coil motor comprised of a voice coil 8 connected to the magnetic head 3 inside the housing 4, and a magnet 9.

This invenion particularly features a vibration damping structure as best seen in FIG. 1. Specifically, the disc memory assembly 1 is movably supported on a pair of rigid shafts 20 by means of a pair of front guides 18 and a pair of rear guides 19. The assembly 1 can therefore be moved in a direction in which the actuator 5 is operative, namely, the voice coil 8 is moved. For smooth movement, a slide bushing 17 is fitted in each of the guides. The pair of shafts 20 are fixedly mounted, at their opposite ends, to a rigid base 16 and the magnetic disc assembly 1 is supported on the base 16.

When the actuator is accelerated or decelerated abruptly, a reaction force is first generated in the magnet 9 and then transmitted to the housing 4, with the result that the whole of the disc memory assembly is affected by the reaction force. Under the influence of this reaction force, the disc assembly 1 moves on the shafts 20 to thereby absorb the reaction force. Of course, the operative direction of disc assembly 1 due to the reactive force is in exact opposition to the operative direction of the actuator. Since the actuator is operated randomly in general services, the reaction force exerted on the disc memory assembly 1 becomes random and the assembly 1 tends to place itself frequently, on the average, at around the midpoint of the shafts 20.

For special services, however, springs 21 may be applied on opposite ends of one shaft 20 (or both shafts as necessary) to thereby absorb a reaction force due to movement of the actuator and also rapidly bring the assembly 1 back to the midpoint after movement of the assembly 1. To prevent resonance, the spring 21 is required to have a spring constant which is designed not to be equal to a period of movement timing of the actuator. (Such consideration is unnecessary when the spring 21 is not used.)

As is clear from the foregoing description, since the disc memory assembly is so configured as to be movable in the operative direction of the actuator for the purpose of absorbing vibrations generated in response to acceleration/deceleration of the actuator, a very compact, inexpensive high-density magnetic disc memory device can be obtained.

To increase storage capacity, several of the megnatic disc memory devices may be packaged in a common enclosure or several of the disc assemblies may be mounted to a common base like the base 16 in the same manner as in FIG. 1. In this way, interaction between the devices or assemblies can be minimized and a highly reliable memory system can be materialized. Furthermore, in contrast to the prior art vibration absorbing movable structure which is disadvantageously provided interiorly of the device, the external movable structure in accordance with the invention will not at all raise the problem of dust generation, thus improving reliability of the disc memory device.

The present invention, therefore, is well adapted to carry out the object and attain the advantages mentioned as well as those inherent therein.

We claim:

1. A disc memory device comprising:

a disc memory assembly including a disc for holding data, a head including means for accessing the data on said disc, and an actuator including motor means for driving said head in a predetermined actuator operative direction;

a base member on which said assembly is disposed; and, support means, connected to said base member, for movably supporting said assembly such that said assembly is movable in the operative direction of said actuator.

2. A disc memory device according to claim 1 wherein said support means comprises a rigid shaft slidably received in a shaft guide, the shaft guide being affixed to the disc, head and actuator, and the support means further includes springs interposed between said base member and said assembly.

3. A disc memory device according to claim 1 wherein said actuator is of a linear drive type.

4. A disc memory comprising:

a housing assembly containing a magnetic disc, an associated recording/reproducing magnetic head, and a linear drive actuator disposed for selectively operatively moving the magnetic head in an actuator operative direction; and, a base for supporting the housing assembly including support shafts fixed to the base for guiding movement of the housing assembly in the direction of the operative movement of the linear actuator whereby upon abrupt acceleration or deceleration of the actuator, vibration reaction forces are absorbed by associated housing assembly along the support shafts.

5. The disc memory device as claimed in claim 4 wherein the linear drive actuator includes a magnet, the magnet being secured to the housing assembly for transmitting reaction forces first generated in the magnet to the housing assembly whereby the whole of the housing assembly is affected by the reaction forces.

6. The disc memory device as described in claim 4 wherein the housing assembly is configured to provide a seal against dust generation at the disc and head.

7. The disc memory device as described in claim 4 wherein the housing assembly includes guides received on the shafts for guiding assembly movement in the direction of actuator operative movement.

8. The disc memory device as described in claim 4 including a plurality of the discs received in the housing.

9. The disc memory device as claimed in claim 4 including a plurality of the housings mounted to the base.

10. A disc memory device including a support base, a magnetic disc and an associated housing, and a linear drive actuator and magnetic head assembly;

the actuator and head assembly being fastened to the housing for common damping of reactionary vibrational forces generated by abrupt acceleration and deceleration of the actuator;

the base including at least one support shaft generally aligned with the direction of operative actuator movement;

the housing and assembly including a plurality of guides mounted to the support shaft for movable support of the assembly in the direction of operative actuator movement whereby the reactionary vibrational forces are damped and absorbed by the movement of the housing and actuator and head assembly.

* * * * *